(12) United States Patent
Svendsen et al.

(10) Patent No.: US 8,290,187 B2
(45) Date of Patent: Oct. 16, 2012

(54) HEARING DEVICE AND EARPIECE THEREFORE

(75) Inventors: Klaus L. Svendsen, Smørum (DK); Claus Würfel, Smørum (DK); Jesper Trolle, Smørum (DK)

(73) Assignee: Oticon A/S, Smorum (DK)

( * ) Notice: Subject to any disclaimer, the term of this patent is extended or adjusted under 35 U.S.C. 154(b) by 1233 days.

(21) Appl. No.: 11/905,412

(22) Filed: Sep. 28, 2007

(65) Prior Publication Data

US 2008/0080731 A1    Apr. 3, 2008

Related U.S. Application Data

(60) Provisional application No. 60/848,011, filed on Sep. 29, 2006.

(51) Int. Cl.
*H04R 25/00* (2006.01)
(52) U.S. Cl. .................. 381/312; 381/325; 381/23.1
(58) Field of Classification Search ............. 381/312, 381/325, 23.1
See application file for complete search history.

(56) References Cited

U.S. PATENT DOCUMENTS

| 6,359,993 | B2 * | 3/2002 | Brimhall ................ 381/328 |
| 7,110,562 | B1 * | 9/2006 | Feeley et al. ............ 381/322 |
| 2005/0244026 | A1 * | 11/2005 | Nielsen et al. .......... 381/380 |
| 2006/0133636 | A1 * | 6/2006 | Harvey et al. ........... 381/380 |

FOREIGN PATENT DOCUMENTS

| EP | 1 039 779 A2 | 9/2000 |
| WO | WO-99/07182 A2 | 2/1999 |
| WO | WO 9907182 A2 * | 2/1999 |
| WO | WO-01/43498 A1 | 6/2001 |
| WO | WO-01/43499 A1 | 6/2001 |

* cited by examiner

*Primary Examiner* — David Vu
*Assistant Examiner* — Brandon Fox
(74) *Attorney, Agent, or Firm* — Birch, Stewart, Kolasch & Birch, LLP

(57) ABSTRACT

This invention relates to a hearing device and earpiece therefore. The hearing device comprises a BTE unit for converting and processing sound to an electrical signal and a tubular element communicating the electrical signal to an earpiece. The earpiece comprises a canal element providing a tight fit of the earpiece in an ear canal, and a speaker element rotate-ably mounted in the canal element.

17 Claims, 2 Drawing Sheets
(2 of 2 Drawing Sheet(s) Filed in Color)

HEARING DEVICE AND EARPIECE THEREFORE

This Nonprovisional application claims priority under 35 U.S.C. §119(e) on U.S. Provisional Application No(s). 60/848,011 filed on Sept. 29, 2006 the entire contents of which are hereby incorporated by reference.

FIELD OF INVENTION

This invention relates to a hearing device, such as a behind-the-ear (BTE) hearing aid, and to an earpiece for a hearing device. In this context an earpiece may be an in-the-ear part or a mould to be used in a hearing aid, and the earpiece may be provided with or without a speaker.

BACKGROUND OF INVENTION

Generally, a state of the art hearing aid, such as, for example, disclosed in US patent application no.: 2005/0244026, comprises a flexible earpiece to be inserted into the outer part (sometimes referred to as cartilaginous or softer region) of the ear canal and connected to a BTE device through a connecting tubular element. The flexible earpiece may comprise a receiver, i.e. a hearing aid speaker, mounted on to the earpiece so as to inject sound into the ear canal. This configuration is general known as receiver-in-the-ear (RITE) hearing aid. Alternatively, the BTE comprises the receiver and the sound is injected into the tubular connector communicating the sound to the earpiece.

The flexible earpiece may additionally comprise a vent so as to provide an open ear configuration thereby reducing occlusion effects but significantly reducing the allowable gain at which acoustical feedback occurs. Hence the flexible earpiece is particularly for use when hearing impairment of the user of the hearing aid is mild.

Further, U.S. Pat. No. 5,606,621 discloses a hybrid BTE and completely-in-canal (CIC) hearing aid, where the earpiece is implemented as a CIC element shaped to into the ear canal in such a manner to touch the bony region of the ear canal. By inserting the CIC element deep into the bony region of the ear canal occlusion effect may be avoided while a high gain still may be maintained, since sound communicated through the tissue into the ear canal (instead of from ear opening) may freely escape the ear canal. Hence this hybrid BTE/CIC hearing aid provides benefits for users having a greater hearing impairment.

In addition, US patent application no.: 2004/0010181 discloses another hybrid BTE/CIC hearing aid comprising a connector for communicating the processed sound from a processor in the BTE to a speaker in the CIC part. The connector is detachably connected to either the BTE or CIC part and is designed to be inserted in ear canal so deep as to touch the bony part of the ear canal. The connector therefore must be sufficiently rigid to allow the connector to be used to insert and remove the CIC part from the ear canal of the user.

The U.S. Pat. No. 5,606,621 and US patent application no.: 2004/0010181 basically describe closed systems, i.e. systems, which when positioned in the outer region of the ear canal causes severe occlusion effects, which are caused by encapsulating sound conducted via tissue to the residual space between the tympanic member and closed system earpiece. Hence the purpose of the hearing aids described in these U.S. patent documents is to position the CIC parts in the bony part or the inner most part of the ear canal thereby avoiding occlusion effect, which is not transmitted to the bony part of the ear canal. However, for users the insertion into the bony part of the ear canal may seem rather intrusive.

SUMMARY OF THE INVENTION

An object of the present invention is therefore to provide a hearing aid earpiece for insertion in the outer part of the ear canal, which accomplishes sufficient gain for users.

A particular advantage of the present invention relates to the fact that the earpiece presents an open configuration to the user thus avoiding occlusion, while maintaining a firm fixture for the earpiece in the ear canal.

A particular feature of the present invention relates to the designed shape of the earpiece providing the possibility of decreasing the vent diameter, while prohibiting the occlusion effects, and thus enabling greater gain.

The above object, advantage and feature together with numerous other objects, advantages and features, which will become evident from below detailed description, are obtained according to a first aspect of the present invention by a hearing device comprising a BTE unit adapted to convert and process sound to an electrical signal and a tubular element adapted to communicate said electrical signal to an earpiece, wherein said earpiece comprises a canal element adapted to provide a tight fit of said earpiece in an ear canal, and a speaker element rotate-ably mounted in said canal element.

The term "hearing device" should in this context be construed as a hearing aid, such as a BTE possibly with a receiver-in-the-ear RITE solution (receiver is a general term for a speaker within the hearing device technology), a hearing apparatus, or an assistive listening device.

By rotate-ably mounting the speaker element in the canal element enables the user of the hearing device to adjust the earpiece relative to the tubular element and BTE unit so as to obtain the best fit for the user.

The speaker is adapted to receive an electrical signal and convert this to a sound pressure in the ear canal so as to improve the hearing of the user.

The earpiece according to the first aspect of the present invention may comprise a vent extending axially through the canal element. The vent, advantageously, allows sound pressure equalisation between ambient surroundings and the residual space between the tympanic membrane and the canal element, thus removing the occlusion effect experienced by the user of the hearing device.

The canal element according to the first aspect of the present invention may comprise snapping means for engaging said speaker element to said canal element. The snapping means may be an integral part of the canal element or may be separately mounted in the canal element. The term "snapping" is this context to be construed as detachably engaging, clicking on or locking together of two parts.

The speaker element according to the first aspect of the present invention may comprise a wax filter adapted to protect the speaker element from earwax entering. Alternatively, or in addition the snapping means may comprise an expendable wax filter adapted to further protect the speaker element from earwax entering. The expendable wax filter may, advantageously, be replaced whenever the wax filter is blocked. The earpiece having an outer expendable and an inner wax filter significantly increases the ability for a user to secure the operation of the hearing device. That is, the user may when experiencing decreased sound quality change the expendable wax filter and try the hearing device earpiece with a new expendable wax filter. Obviously, if the user still experiences decreased sound quality, the user may further check the wax filter in the speaker.

The canal element according to the first aspect of the present invention may comprise an axial bore for receiving said speaker element, said bore having an axial length in the range between 3 and 10 mm such as in the ranges between 3 and 6 mm, 6 and 9 mm, 9 and 12 mm, or 4 and 11 mm, 5 and 10 mm, 7 and 8 mm, or any combination thereof. The axial length of the bore, in fact, may express the axial length of the canal element, i.e. the bore extends through the whole length of the canal element.

The vent according to the first aspect of the present invention may have an axial length shorter than the axial length of the bore. By reducing the axial length of the vent advantageously enables a smaller vent diameter to be implemented for achieving the same results. Hence greater gain may be applied in the BTE unit. The canal element may thus comprise a proximal surface, which extends on one plane substantially perpendicular to said ear canal, and a distal surface facing towards the tympanic member, which extends on a plurality of planes substantially perpendicular to said ear canal. The terms "distal" and "proximal" should in this context be construed in relation to the BTE unit.

The canal element according to the first aspect of the present invention may further comprise a pull-out string extending from the proximal surface at least partly parallel to the tubular element. The pull-out string provides a means for the user to safely pull out the earpiece from the ear, i.e. without pulling the elements apart.

The speaker element according to the first aspect of the present invention may further comprise a hole for receiving a flexible member adapted to support said earpiece in said ear canal. The flexible member or ear-grip may be adapted to abut a surface of the outer ear.

The canal element according to the first aspect of the present invention may be manufactured by means of rapid manufacturing techniques such as stereo-lithographic manufacturing, selective laser sintering, shape deposition manufacturing or laminated object manufacturing. By using a SLA any customer fit is significantly simplified and customer variances may be incorporated in any earpiece.

The above object, advantage and feature together with numerous other objects, advantages and features, which will become evident from below detailed description, are obtained according to a second aspect of the present invention by a hearing device earpiece for connecting to a BTE unit adapted to convert and process sound to an electrical signal through a tubular element adapted to communicate said electrical signal to said earpiece, wherein said earpiece comprises a canal element adapted to provide a tight fit of said earpiece in an ear canal, and a speaker element rotate-ably mounted in said canal element.

The earpiece according to the second aspect of the present invention may comprise any features of the hearing device according to the first aspect of the present invention.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilized and structural and functional modifications may be made without departing from the scope of the present invention.

Figure 1:
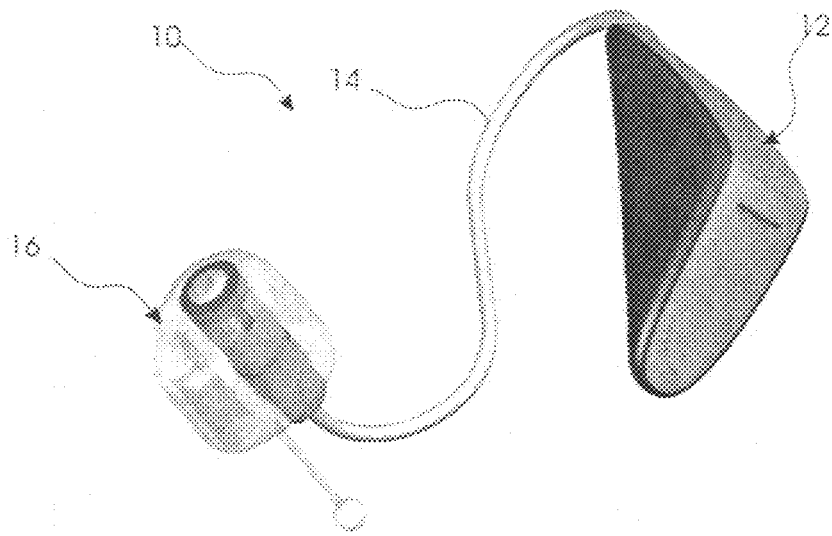
FIG. 1, shows a perspective view of a hearing device according to a first embodiment of the present invention.

FIG. 1 shows a hearing device according to the first embodiment of the present invention and designated in entirety by reference numeral 10. The hearing device 10 comprises a BTE unit 12 converting sound recorded at the BTE unit 12 and processing said sound in accordance with a particular hearing loss, a connector 14 for communicating an electric processed signal to an earpiece 16. The earpiece 16 is adapted to be inserted into an ear canal of a user and converts the electric processed signal back in to sound pressure.

Figure 2:
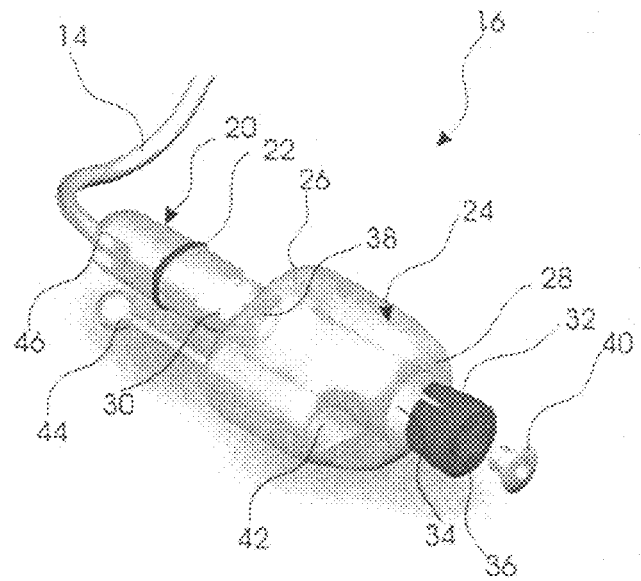
FIG. 2, shows an exploded view of a hearing device earpiece according to the first embodiment of the present invention.

FIG. 2 shows an exploded view of the earpiece 16 and part of the connector 14 described with reference to FIG. 1. The earpiece 16 comprises a speaker 20 connected to the connector 14, which speaker 20 is adapted to convert electrical signals representing processed sound into a sound pressure to be provided in the ear canal of the user of the hearing device. The speaker 20 may advantageously comprise an O-ring 22 for providing a tight fit between the speaker 20 and a canal element 24. The canal element 24 is to be inserted into the outer part of the ear canal of the user of the hearing device 10.

The canal element 24 comprises a proximal surface 26, which faces towards the BTE unit 12, and a distal surface 28, which faces towards the tympanic member when the earpiece 16 is placed in the ear canal.

The speaker 20 comprises a circumferential ridge section 30, which is adapted to snap into engagement with the snapping element 32 thereby maintaining the speaker 20 in the canal element 24 in an axially fixed position within a bore 34 of the canal element 24, while allowing rotational movement of the speaker 20 in the canal element 24. By enabling rotation of the speaker 20 within the canal element 24 an advantageous fitting of the BTE unit 12 relative to the earpiece 16 may be achieved.

The snapping element 32 may be an integral part of the canal element 24 or an independent part inserted into the bore 34 from the distal surface 28. In case the snapping element 32 is an independent part it may comprise a flange 36 axially locking the snapping element 32 against further axial movement towards the proximal surface 26.

Hence the speaker 20 is inserted into the bore 34 from the proximal surface 26 of the canal element 24, and the snapping element 32 as an independent part is inserted from distal surface 28 of the canal element 24, where the ridge section 30 on the speaker 20 snaps into the snapping element 32 thus locking the speaker 20 in the canal element 24. In case the snapping element 32 is an integral part of the canal element 24, the speaker 20 is simply inserted from the distal surface 28, where the ridge section 30 on the speaker 20 snaps into the snapping element 32.

The speaker 20 comprises a wax filter 38 for protecting the speaker 20 from ear wax produced by the user of the hearing device 10, when the earpiece 16 is inserted into the outer ear canal of the user.

In addition, the earpiece 16 comprises a second wax filter 40, which may be expendable so that when ever the user experience that the hearing device 10 has reduced operations then the use may exchange the wax filter 40 by simply removing second wax filter 40 and inserting a new wax filter 40. This functionality is, particularly, advantageous since the user may perform a first test of the operability of the hearing device 10 without needing to travel to an audiologist or hearing aid dispenser.

The earpiece 16 further comprises a vent 42 for allowing the sound pressure variations in the outer ear canal caused by sound travelling to the ear canal through the tissue and cartilage of the user. Hence the occlusion experienced by the user is significantly reduced. The diameter and length of the vent 42 are determined in accordance with the required gain for compensating a particular hearing impairment. However, by providing a shortened axial length of the vent 42 a smaller diameter may be used achieving the required effects, i.e. occlusion and gain.

The earpiece 16 further comprises a pull out string 44 for enabling the user to pull the earpiece 16 out of the ear canal of the user. When inserting the earpiece 16 into the outer ear canal of the user, the user may hold on the part of the speaker 20 extending out of the canal element 24 and gently insert the earpiece into the ear canal.

The speaker 20 further comprises a bore 46 for receiving a retention means holding the earpiece 16 in position in the outer ear canal of the user. The retention means, also called an ear grip, provides support to the earpiece 16 by flexing round the edges of the cavum concha.

Figure 3:
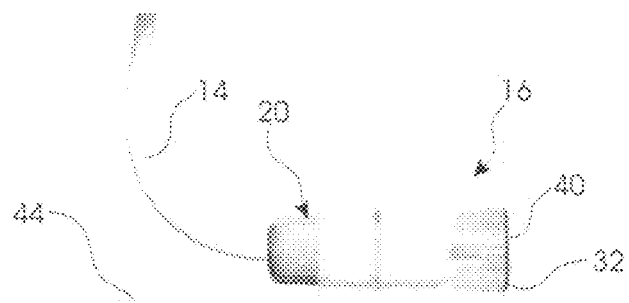
FIG. 3, shows a side view of the hearing device earpiece according to the first embodiment of the present invention.
Figure 4:
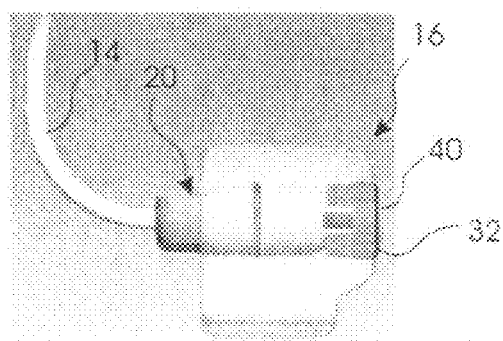
FIG. 4, shows a cross-sectional view of the hearing device earpiece according to the first embodiment of the present invention.

FIG. 3 shows a side view of the earpiece 16 having the speaker 20 inserted into the bore 34 and snapped into the snapping element 32. The second wax filter 40 is shown as inserted into the snapping element 32. The earpiece 16 in FIG. 3 shows the pull out string 44, whereas the earpiece according to the second embodiment of the present invention shown in FIG. 4 does not have a pull out string.

Figure 5:
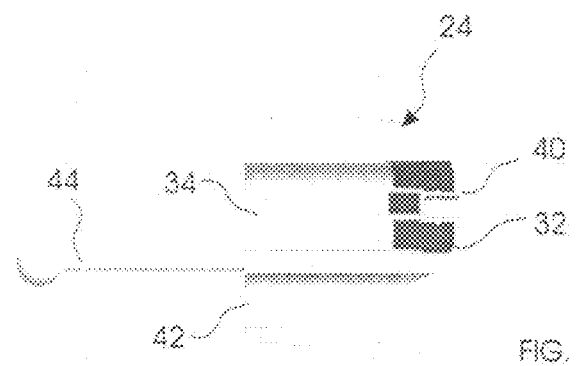
FIG. 5, shows a perspective view of the hearing device earpiece according to the first embodiment of the present invention.

FIG. 5, shows the canal element 24 according to the first embodiment of the present invention in a cross-sectional view where the snapping element 32 is inserted into the bore 34 and the second wax filter 40 is inserted into the snapping element 32. The bore 34 according to the first embodiment of the present invention has an axial length of 8 mm. However, the axial length of the bore 34 may be the range between 3 and 10 mm such as in the ranges between 3 and 6 mm, 6 and 9 mm, 9 and 12 mm, or 4 and 11 mm, 5 and 10 mm, 7 and 8 mm, or any combination thereof. The axial length of the bore 34, in fact, may express the axial length of the canal element, i.e. the bore 34 extends through the whole length of the canal element 24.

The axial length of the bore 34 is greater than the axial length of the vent 42. As described above with reference to FIG. 2 by shortening the axial length of the vent 42 the diameter of the vent 42 may be reduced. The axial length of the vent 42 according to the first embodiment of the present invention is 5.5 mm. However, the vent 42 may be in the range between 2 and 9 mm, such as in the ranges between 2 and 4 mm, 4 and 6 mm, 6 and 9 mm, or 3 and 8 mm, 4 and 7 mm, 5 and 6 mm, or any combination thereof.

Figure 6:
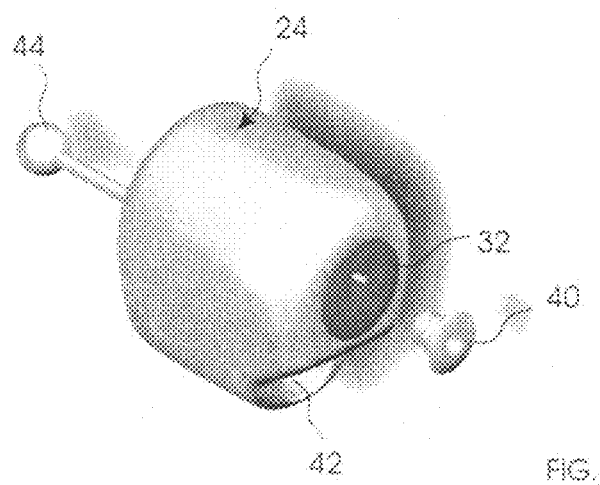
FIG. 6, shows a side view of a hearing device earpiece according to a second embodiment of the present invention.

FIG. 6, shows the canal element 24 according to the first embodiment of the present invention in a perspective view, where the second wax filter 40 is to be inserted into the snapping element 32.

The invention claimed is:

1. A hearing device, comprising:
   a BTE unit configured to convert and process sound to an electrical signal; and
   a tubular element configured to communicate said electrical signal to an earpiece, wherein
   said earpiece includes
      a canal element configured to provide a tight fit of said earpiece in an ear canal, the canal element including a proximal end and a distal end,
      a speaker element rotate-ably mounted in said canal element, said speaker element including a ridge portion, and
      a retainer separate from the canal element and configured to snap onto the ridge portion of the speaker element, the retainer including a flange axially locking the retainer against further axial movement toward the proximal end of the canal element.

2. A hearing device according to claim 1, wherein said speaker element comprises a wax filter.

3. A hearing device according to claim 1, wherein said retainer comprises an expendable wax filter.

4. A hearing device according to claim 1, wherein said earpiece further comprises a vent extending axially through said canal element.

5. A hearing device according to claim 1, wherein said canal element comprises an axial bore for receiving said speaker element, said bore having an axial length in the range between 3 and 12 mm such as in the ranges between 3 and 6 mm, 6 and 9 mm, 9 and 12 mm, or 4 and 11 mm, 5 and 10 mm, 7 and 8 mm, or any combination thereof.

6. A hearing device according to claim 5, wherein said vent has an axial length shorter than the axial length of said axial bore.

7. A hearing device according to claim 1, wherein said canal element comprises a proximal surface at the proximal end, which extends on one plane substantially perpendicular to said ear canal, and a distal surface at the distal end, facing towards the tympanic member, which extends on a plurality of planes substantially perpendicular to said ear canal.

8. A hearing device according to claim 7, wherein said canal element further comprises a pull-out string extending from the proximal surface at least partly parallel to the tubular element.

9. A hearing device according to claim 1, wherein said speaker element further comprises a hole for receiving a flexible member adapted to support said earpiece in said ear canal.

10. A hearing device according to claim 1, wherein said canal element is manufactured by means of rapid manufacturing techniques.

11. A hearing device according to claim 1, wherein
   the rotatable mounting of the speaker element in the canal element enables the speaker element to rotate within the canal element without separating the speaker element from the canal element.

12. A hearing device according to claim 1, wherein
   rotation of the speaker element relative to the canal element does not disengage the retainer from the ridge portion.

13. A hearing device according to claim 1, wherein
   the retainer continues to snap onto the ridge portion of the speaker element when the speaker element is rotated relative to the canal element.

14. A hearing device earpiece for connecting to a BTE unit configured to convert and process sound to an electrical signal through a tubular element configured to communicate said electrical signal to said earpiece, the earpiece comprising:
- a canal element configured to provide a tight fit of said earpiece in an ear canal, the canal element including a proximal end and a distal end;
- a speaker element rotateably mounted in said canal element, said speaker element including a ridge portion; and
- a retainer separate from the canal element and configured to snap onto the ridge portion of the speaker element, the retainer including a flange axially locking the retainer against further axial movement toward the proximal end of the canal element.

15. The hearing device earpiece according to claim 14, wherein
the rotatable mounting of the speaker element in the canal element enables the speaker element to rotate within the canal element without separating the speaker element from the canal element.

16. The hearing device earpiece according to claim 14, wherein
rotation of the speaker element relative to the canal element does not disengage the retainer from the ridge portion.

17. The hearing device earpiece according to claim 14, wherein
the retainer continuously snaps onto the ridge portion of the speaker element when the speaker element is rotated relative to the canal element.

* * * * *